(12) United States Patent
Perkins

(10) Patent No.: US 10,882,122 B2
(45) Date of Patent: Jan. 5, 2021

(54) SHEAR

(71) Applicant: MILWAUKEE ELECTRIC TOOL CORPORATION, Brookfield, WI (US)

(72) Inventor: Kenneth Perkins, Waukesha, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 0 days.

(21) Appl. No.: 15/934,690

(22) Filed: Mar. 23, 2018

(65) Prior Publication Data
US 2018/0272445 A1 Sep. 27, 2018

Related U.S. Application Data

(60) Provisional application No. 62/476,284, filed on Mar. 24, 2017.

(51) Int. Cl.
| B23D 29/02 | (2006.01) |
| B23D 17/02 | (2006.01) |
| B26B 15/00 | (2006.01) |
| B23D 29/00 | (2006.01) |
| B23D 35/00 | (2006.01) |

(52) U.S. Cl.
CPC ............ B23D 29/02 (2013.01); B23D 17/02 (2013.01); B23D 29/00 (2013.01); B23D 35/001 (2013.01); B26B 15/00 (2013.01)

(58) Field of Classification Search
CPC ...... B23D 29/02; B23D 29/026; B23D 29/00; B23D 29/005; B23D 29/023; B23D 29/002; B26B 15/00; B26B 21/56
USPC ............................ 30/188, 278, 179, 180, 131
See application file for complete search history.

(56) References Cited

U.S. PATENT DOCUMENTS

| 342,617 | A | * | 5/1886 | Ligon | ................... B26B 13/22 |
| | | | | | 7/135 |
| 552,490 | A | * | 12/1895 | Benecke | ............. H02G 1/1217 |
| | | | | | 30/90.9 |
| 2,273,376 | A | * | 2/1942 | Reynolds | ............ B23D 29/005 |
| | | | | | 30/247 |

(Continued)

FOREIGN PATENT DOCUMENTS

| CN | 106992472 A | * | 7/2017 |
| JP | H11-347831 A | | 12/1999 |

OTHER PUBLICATIONS

English Translation of CN106992472 A. (Year: 2017).*
International Search Report and Written Opinion for Application No. PCT/US2018/024128 dated Jul. 6, 2018 (19 pages).

*Primary Examiner* — Jennifer B Swinney
(74) *Attorney, Agent, or Firm* — Michael Best & Friedrich LLP

(57) ABSTRACT

A power shear tool includes a housing portion, a motor positioned within the housing portion, and a tool head portion extending from the housing portion and including a blade rotatable relative to the tool head portion. The power shear tool includes a workpiece support member positioned proximate the tool head portion. The workpiece support member includes a top surface and a bottom surface opposite the top surface, side surfaces extending between the top and the bottom surfaces, a first channel defined in the top surface and extending from at least one of the side surfaces, and a second channel defined in the top surface. The second channel intersects the first channel and extends transverse to the first channel.

13 Claims, 15 Drawing Sheets

(56) References Cited

U.S. PATENT DOCUMENTS

| | | | | |
|---|---|---|---|---|
| 3,872,588 | A * | 3/1975 | Bogaty | B26B 21/4006 30/50 |
| 3,914,864 | A * | 10/1975 | Prince | B21F 13/00 30/90.6 |
| 4,106,195 | A * | 8/1978 | Berg | B26B 17/00 30/178 |
| 4,130,037 | A | 12/1978 | Matthews | |
| 4,549,349 | A | 10/1985 | Harrison | |
| 5,002,135 | A * | 3/1991 | Pellenc | A01G 3/037 173/170 |
| 5,150,522 | A * | 9/1992 | Gwo-Jiang | H02G 1/1224 30/91.2 |
| 5,542,182 | A * | 8/1996 | Martinez | B26B 17/00 30/178 |
| 6,264,669 | B1 * | 7/2001 | Le Louarn | A61B 17/24 30/254 |
| 6,308,421 | B1 * | 10/2001 | Wang | B23D 29/02 30/178 |
| 8,627,752 | B2 * | 1/2014 | Saad | E04B 9/068 30/131 |
| 2002/0026712 | A1 * | 3/2002 | Hackman | B23D 29/005 30/254 |
| 2002/0124413 | A1 * | 9/2002 | Rutkowski | A01G 3/02 30/251 |
| 2003/0029295 | A1 | 2/2003 | Yoshimizu et al. | |
| 2005/0160606 | A1 | 7/2005 | Yao | |
| 2007/0204470 | A1 * | 9/2007 | Lai | B26B 17/00 30/244 |
| 2008/0149503 | A1 * | 6/2008 | Pandori | B23D 21/006 206/223 |
| 2009/0188118 | A1 * | 7/2009 | Swinford | B25B 7/02 30/252 |
| 2014/0165410 | A1 | 6/2014 | Johnson et al. | |
| 2014/0182137 | A1 | 7/2014 | Liu et al. | |

* cited by examiner

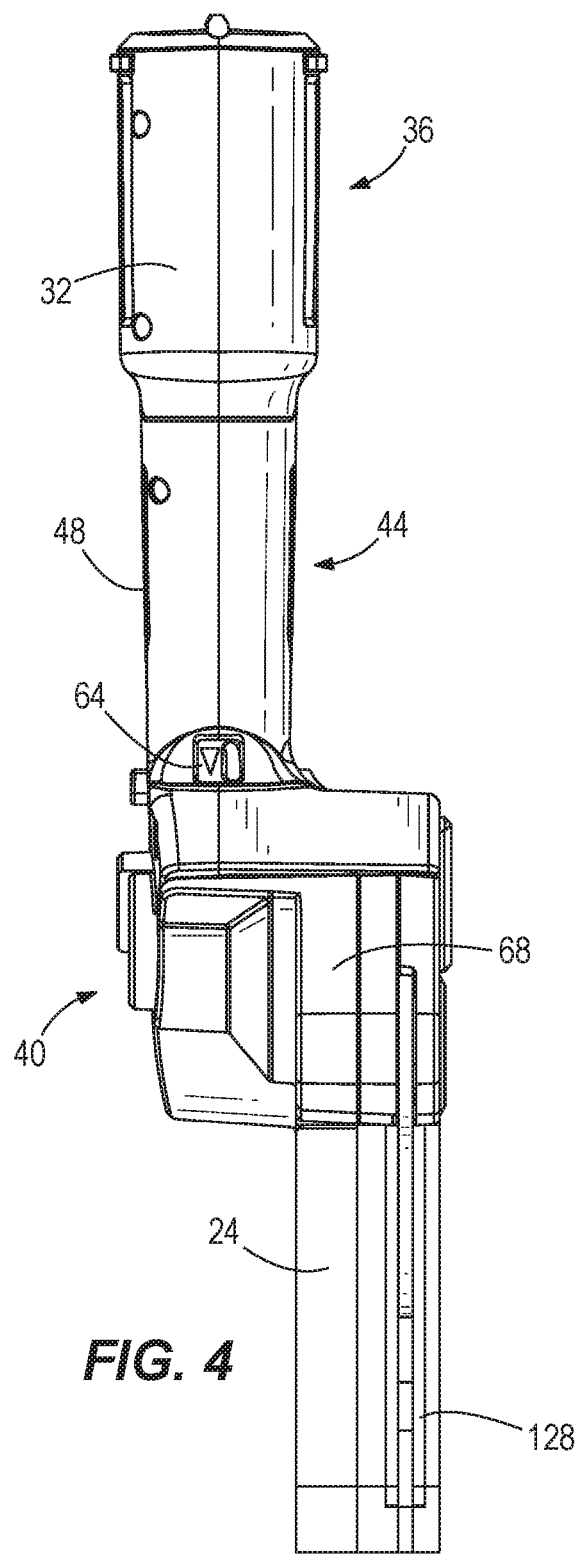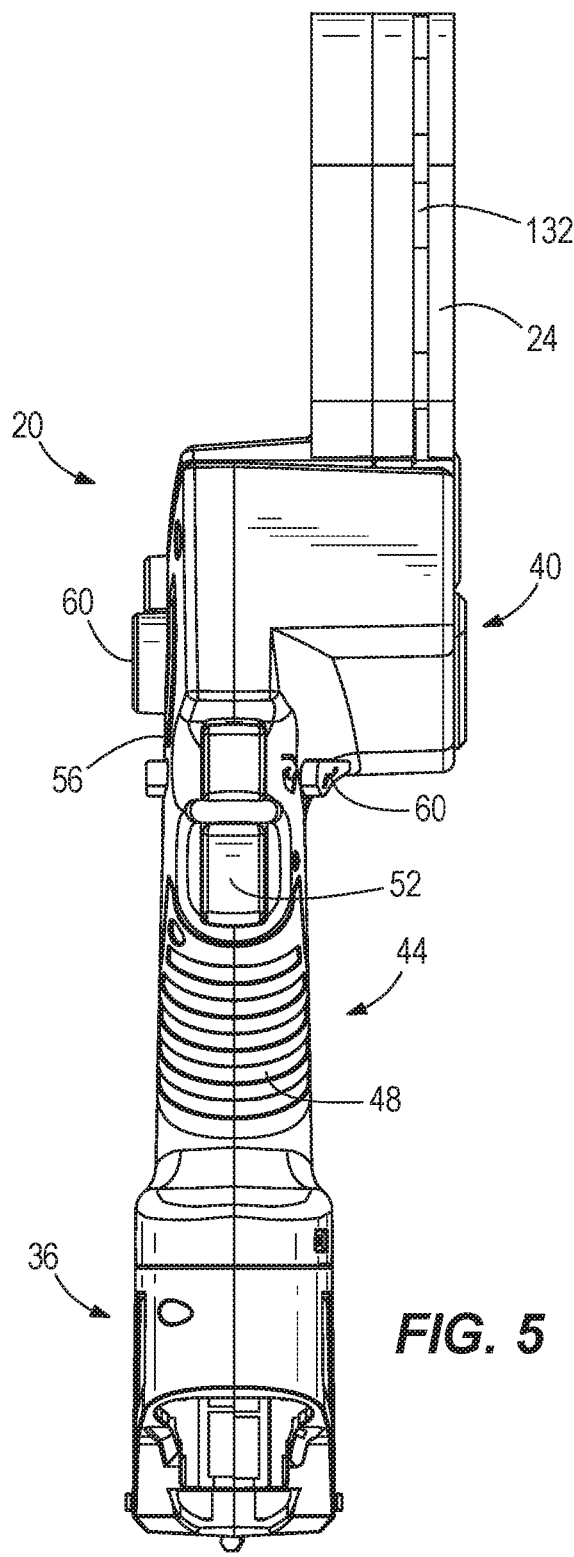

SHEAR

CROSS REFERENCE TO RELATED APPLICATIONS

This application claims priority to U.S. Provisional Patent Application No. 62/476,284 filed on Mar. 24, 2017, the contents of which are incorporated by reference herein.

FIELD OF THE INVENTION

The present invention relates to a shear tool, and more particularly to a power shear tool.

BACKGROUND OF THE INVENTION

There are various shear tools known in the art for cutting a workpiece such as a steel stud. Typically, these shear tools are able to cut only partially through the steel studs. Furthermore, the cut studs may have rough or jagged edges.

SUMMARY OF THE INVENTION

The invention provides, in one aspect, a power shear tool including a housing portion, a motor positioned within the housing portion, and a tool head portion extending from the housing portion and including a blade rotatable relative to the tool head portion. The power shear tool includes a workpiece support member positioned proximate the tool head portion. The workpiece support member includes a top surface and a bottom surface opposite the top surface, side surfaces extending between the top and the bottom surfaces, a first channel defined in the top surface and extending from at least one of the side surfaces, and a second channel defined in the top surface. The second channel intersects the first channel and extends transverse to the first channel.

The invention provides, in another aspect, a workpiece support member for a power shear tool including a top surface and a bottom surface opposite the top surface, side surfaces extending between the top and the bottom surfaces, a first channel defined in the top surface and extending from at least one of the side surfaces, and a second channel defined in the top surface. The second channel intersects the first channel and extends transverse to the first channel.

The invention provides, in another aspect, a blade for a power shear tool including a body configured for rotatable attachment to the power shear tool, the body including a cutting portion and a piercing portion. The piercing portion defines a point that is a first point of contact between the blade and a workpiece.

Other features and aspects of the invention will become apparent by consideration of the following detailed description and accompanying drawings.

BRIEF DESCRIPTION OF THE DRAWINGS

FIG. 4 is a top view of the power shear tool.
FIG. 5 is a bottom view of the power shear tool.

Figure 1:
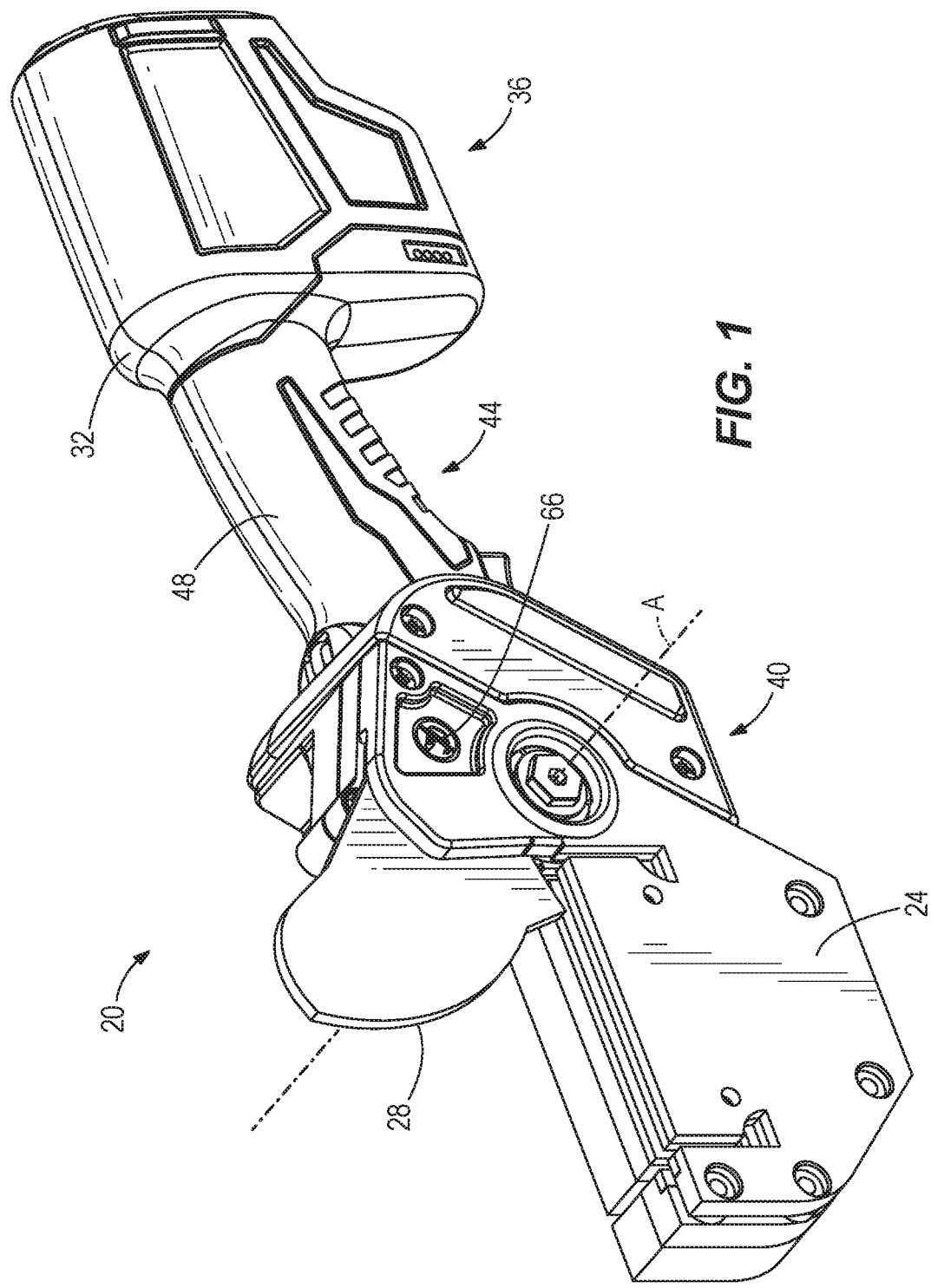
FIG. 1 is a perspective view of a power shear tool according to one embodiment of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

FIGS. 1-11 illustrate a power shear tool 20 for cutting or shearing materials. The power shear tool 20 of this embodiment receives, retains, and cuts construction material. More specifically, the power shear tool 20 includes a material receiving platform 24 that receives and retains a steel stud (FIG. 16) to be cut by a blade 28 of the power shear tool 20. As will be described in greater detail below, the power shear includes the blade 28 driven by a motor 30 (FIG. 9), which drives the blade 28 to cut a steel stud supported by the material receiving platform 24.

With reference to FIGS. 1-5, the power shear tool 20 includes a main housing 32 defining a battery receiving portion 36 and a tool head portion 40 with a handle portion 44 extending therebetween. The battery receiving portion 36 engages and supports a battery pack (not shown) that provides power to the tool 20. In one example, the battery pack may be a power tool battery pack having battery cells of various chemistry types (e.g., lithium ion, nickel cadmium, etc.) configured to have associated voltage outputs (e.g., approximately 12V, 18V 28V, 36V, 48V, 12V-48V, etc.) and capacities (in terms of amp-hours).

Figure 2:
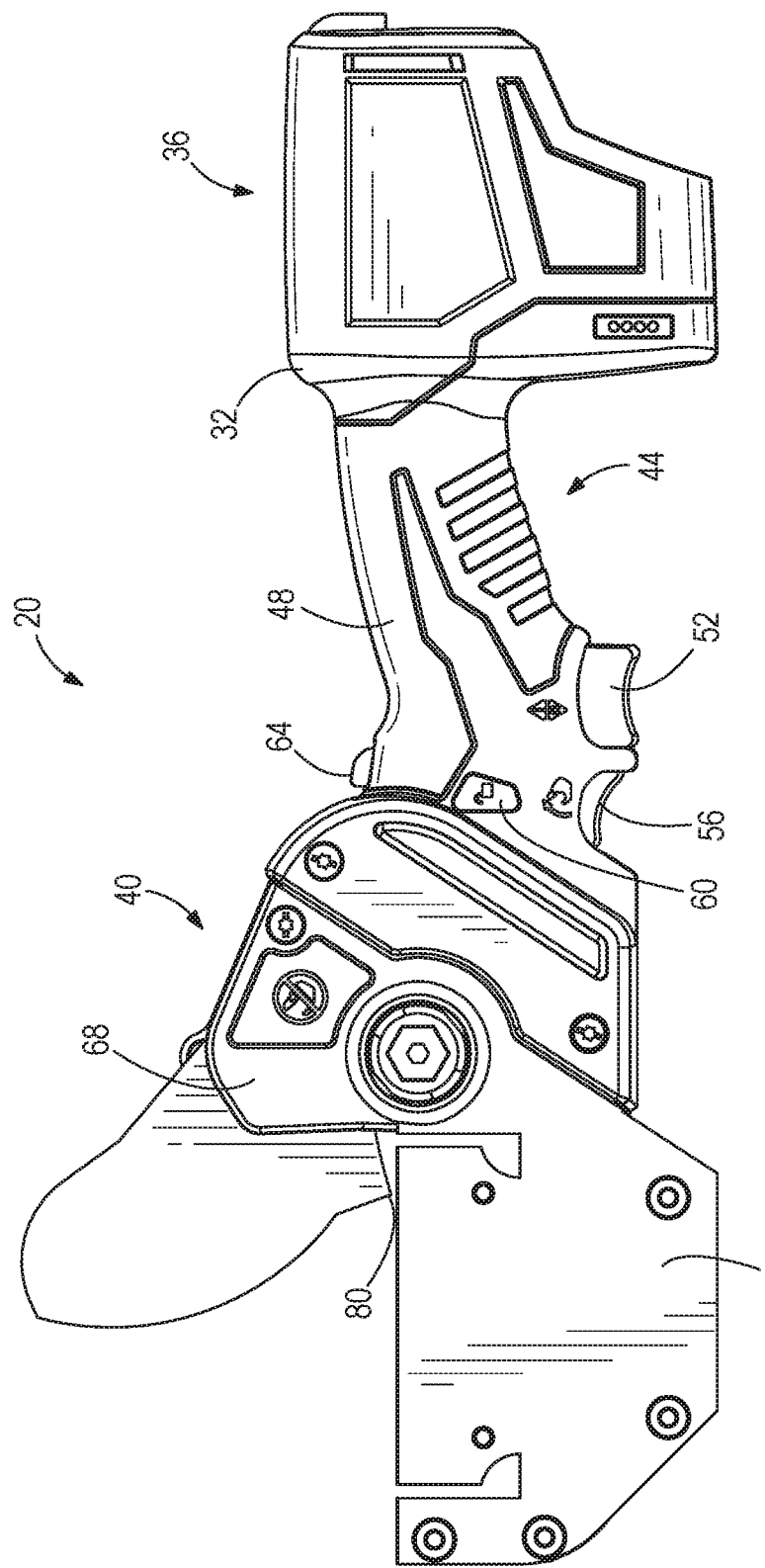
FIG. 2 is a first side view of the power shear tool.
Figure 3:
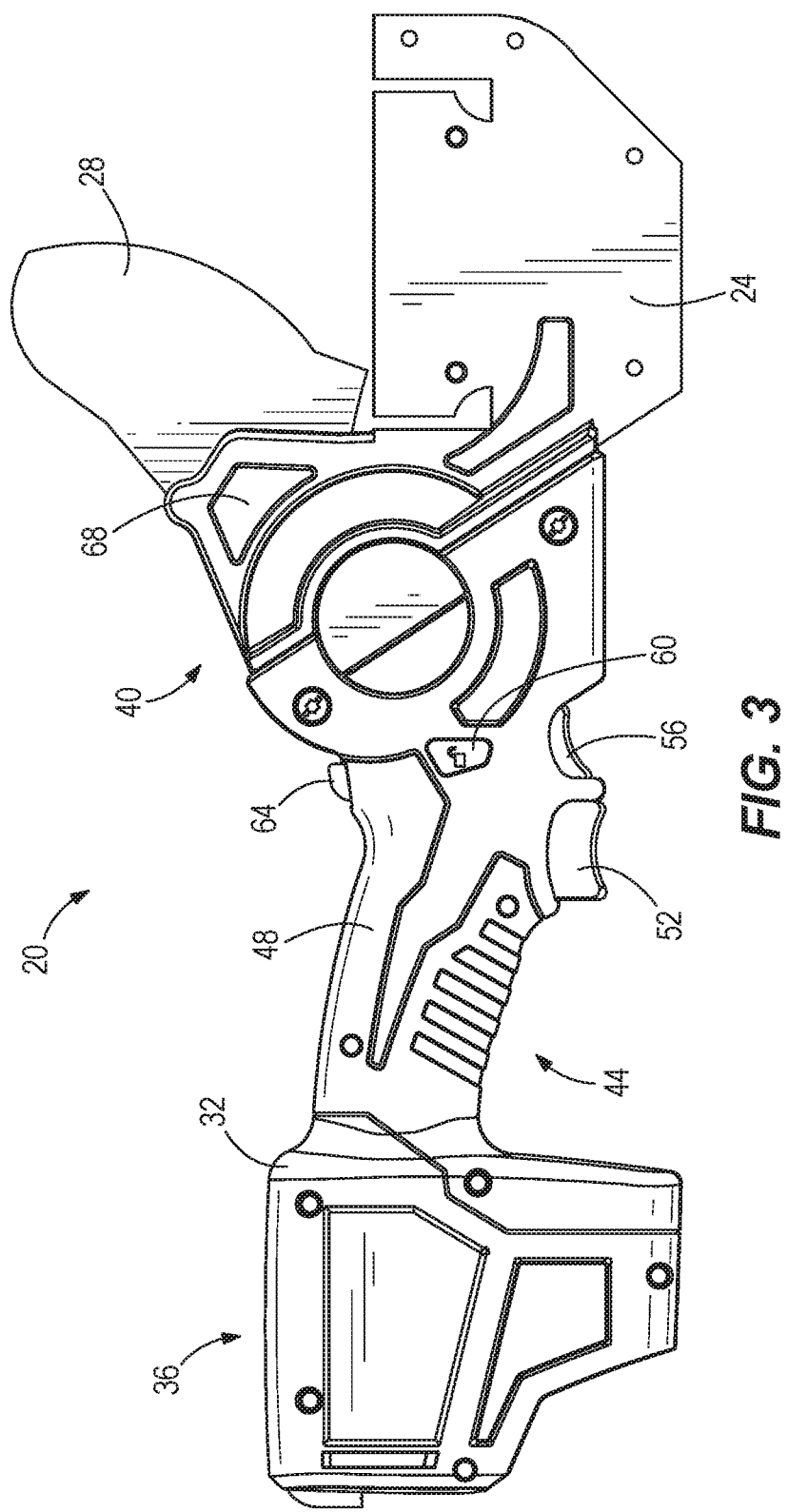
FIG. 3 is a second side view of the power shear tool.

The handle portion 44 includes a grip 48 configured to be grasped by a user (e.g., a pistol style grip), a first actuator 52, a second actuator 56, a third actuator 60, and a fourth actuator 64 (FIGS. 2-3). The first actuator 52 is a trigger for actuating the motor 30 to drive the blade 28. In one embodiment, actuation of the trigger drives the blade 28 through one cutting stroke of the blade 28 from an open position to a completed cut position, regardless of whether or not the trigger is held. In other embodiments, the blade 28 is only driven when the trigger is held. The second actuator 56 is a blade return button to reset the blade 28 to the open position after a cutting operation, which will be described in greater detail below. The third actuator 60 is a trigger lock button including a pair of surfaces for the user to depress to move the first actuator 52 between a locked condition, in which the first actuator 52 cannot be operated, and an unlocked condition, in which the first actuator 52 is free to operate. The fourth actuator 64 controls the direction the motor 30 drives the blade 28, that is, the fourth actuator 64 is a blade forward and reverse switch. Each of the actuators 52, 56, 60, 64 described above may be a button, a trigger, a switch, a slider, or any other actuator in other embodiments.

With continued reference to FIGS. 1-5, the tool head portion 40 supports a tool head 68 including the material receiving platform 24 and the blade 28. In the illustrated embodiment, the tool head 68 is formed separately from the main housing 32 and is removable from the main housing 32, which allows for multiple different tool heads to be supported by the tool head portion 40. For example, the tool head 68 may be removed and replaced after wear, or the tool head 68 may be removed and replaced by a different tool head having a different material receiving platform 24 and/or blade 28. However, in other embodiments, the tool head 68 may be formed integrally with the main housing 32.

Figure 6:
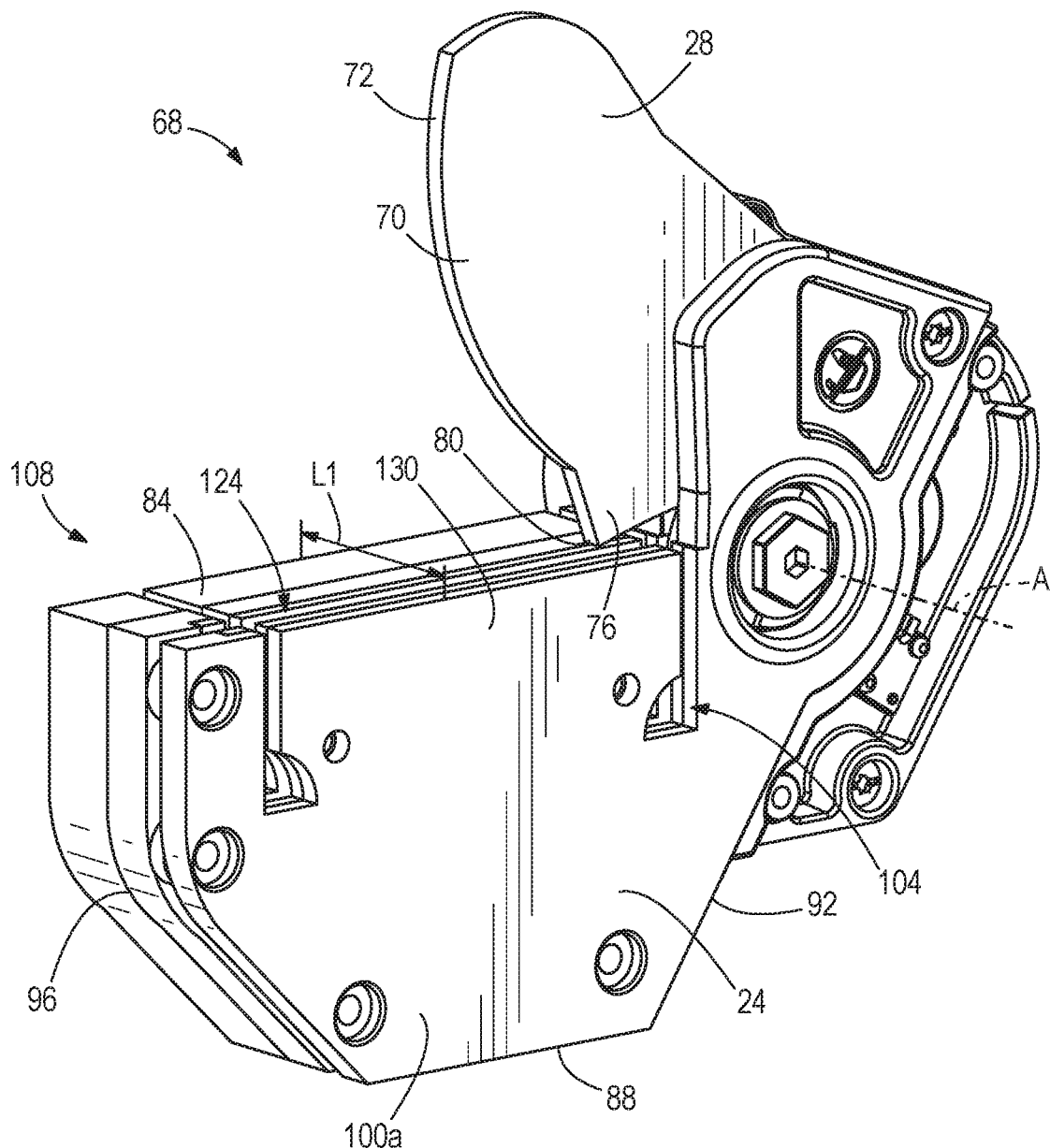
FIG. 6 is a side view of the power shear tool with portions of a housing removed.
Figure 7:
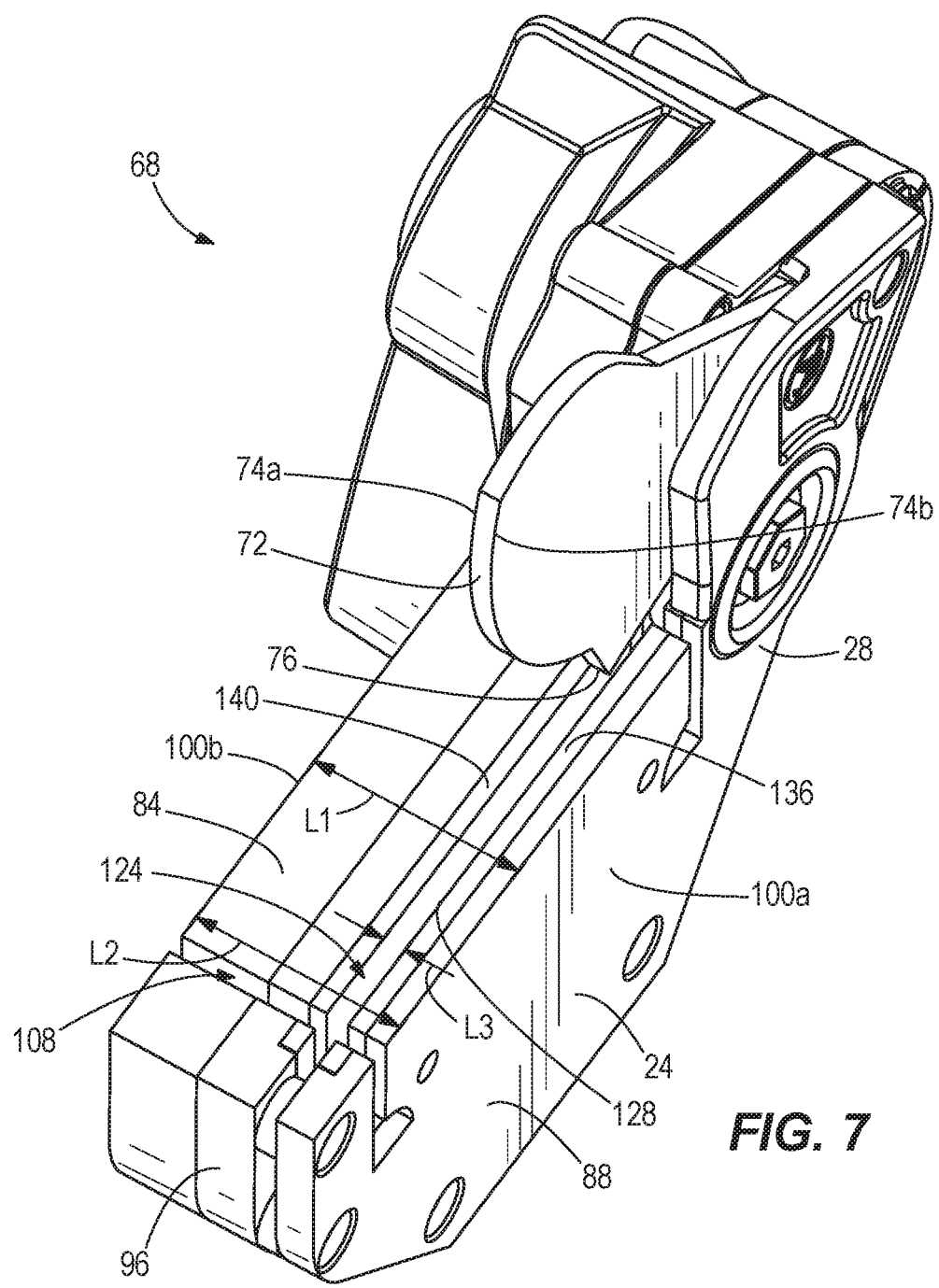
FIG. 7 is a first perspective view of a material platform and a blade of the power shear tool of FIG. 1.
Figure 8:
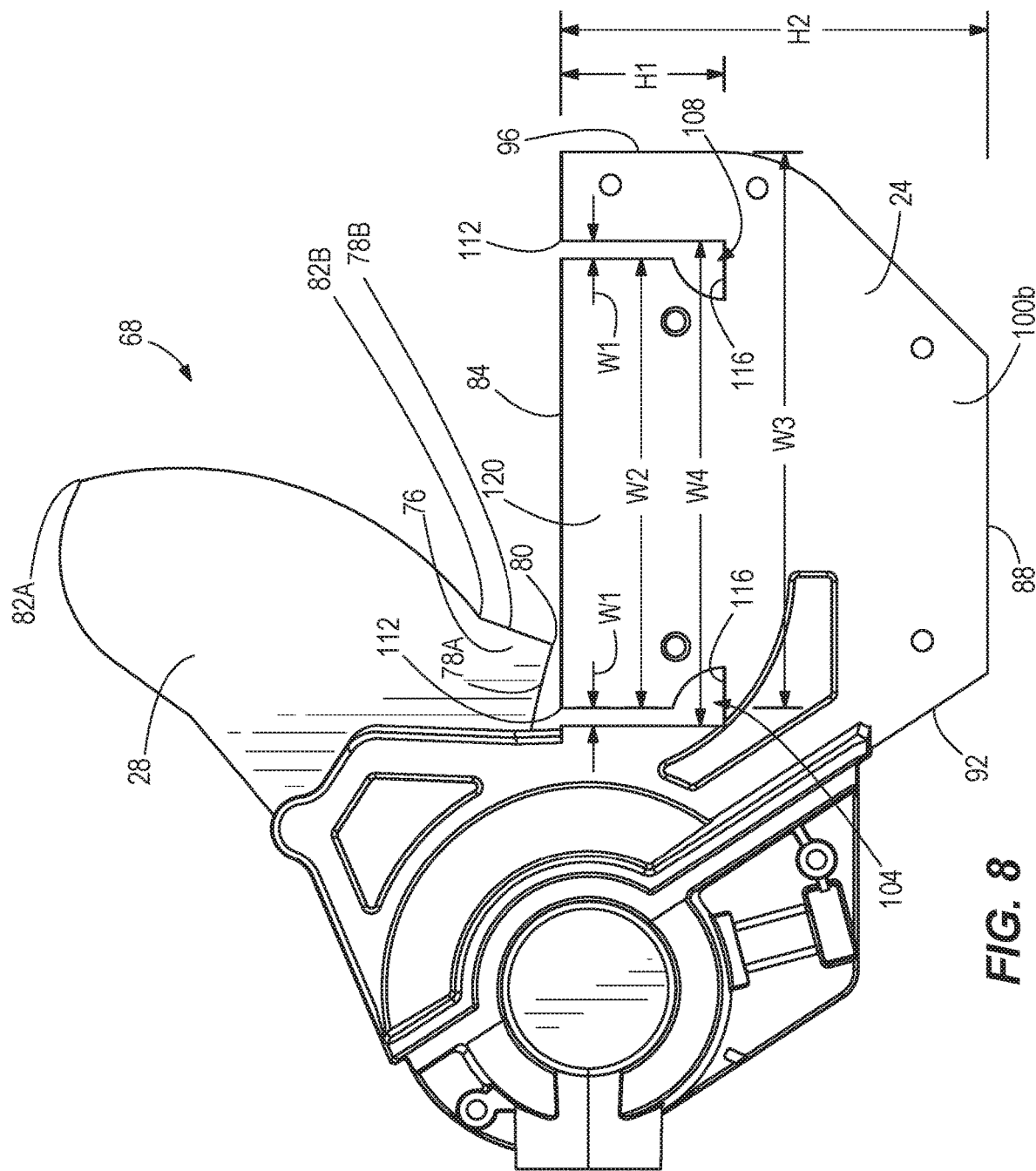
FIG. 8 is a second perspective view of the material platform and the blade of the power shear tool of FIG. 1.

With reference to FIGS. 6-8, the tool head 68 includes the material receiving platform 24 and the blade 28 driven by the motor 30, which pivots about an axis A (FIG. 1). Specifically, the blade 28 includes a body 70 configured for rotatable attachment to the power shear tool 20. The pivoting blade 28 (e.g., a steel blade, a hardened steel blade, a carbide blade, etc.) includes a cutting portion 72 and a piercing portion 76. In the illustrated embodiment, the cutting portion 72 is defined by a flat arcuate section with sharpened side edges 74a, 74b (FIG. 7), and the piercing portion 76 is defined by two substantially linear edges 78A, 78B that meet at a piercing point 80. More specifically, the flat arcuate section extends from a first end 82A to a second end 82B, and one of the linear edges 78B extends from the second end 78B to the piercing point 80 (FIG. 8). The piercing point 80 is the first point of contact between the blade 28 and a workpiece (i.e., stud) during a cutting operation. The initial piercing of the workpiece during operation reduces deformation of the workpiece, reduces cutting times, and decreases the amount of force necessary to initially puncture the workpiece. However, the shape of the blade 28 may be varied in other embodiments. For example, the blade 28 may be defined by two linear edges that meet at a point. Alternatively, the blade 28 may have single sharpened edge on the arcuate portion. In addition, the blade 28 may define a single linear edge. In yet another alternative, the blade 28 may include single arcuate edge.

Figure 16:
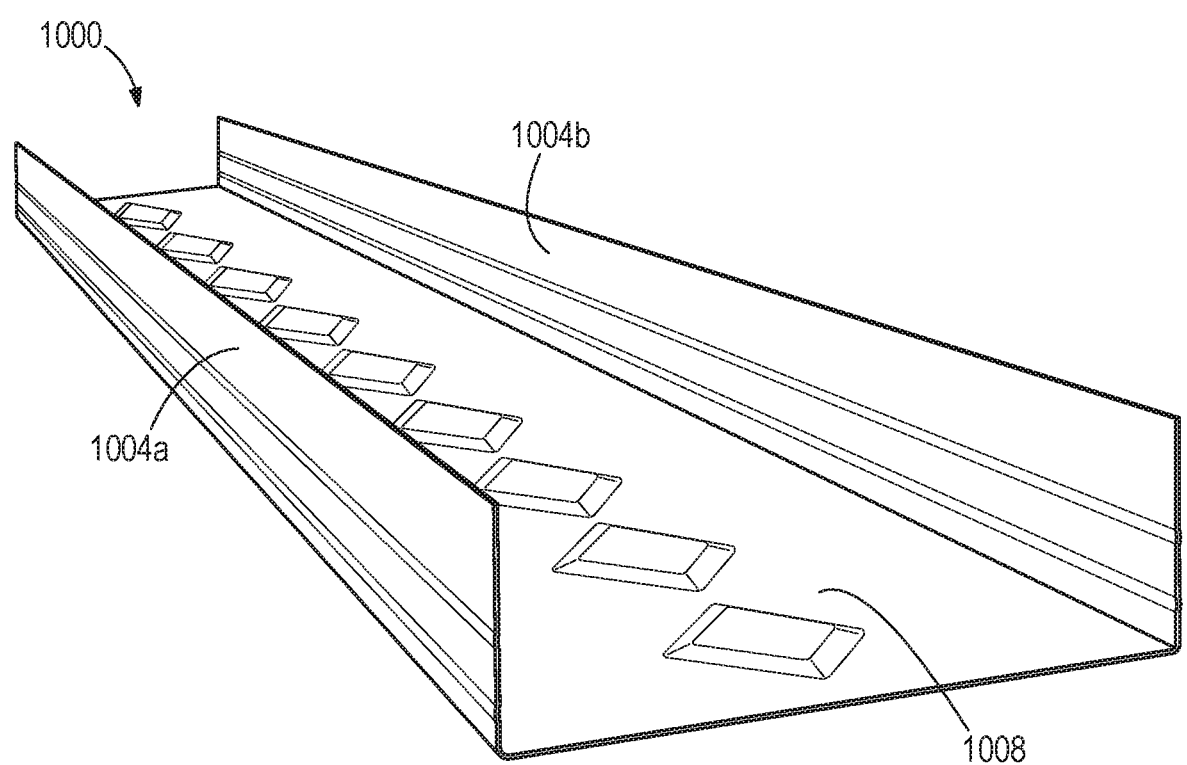
FIG. 16 is a perspective view of a steel stud.

With continued reference to FIGS. 6-8, the material receiving platform 24 includes a planar top surface 84, a planar bottom surface 88 that is generally parallel to the top surface 84, a rearward side 92 that is angled relative to the top and bottom surfaces 84, 88, a forward side 96 having two linear portions separated by an angled portion, and a pair of lateral sides 100a, 100b. The pair of lateral sides 100a, 100b include side surfaces extending between the top surface 84 and the bottom surface 88, and are generally perpendicular to the top surface 84 and the bottom surface 88 such that a material support length L1 is defined by the top surface 84 between the lateral sides 100a, 100b. The material receiving platform 24 also includes a first material receiving channel or first channel 104 and a second material receiving channel or second channel 108 extending from the top surface 84 into the platform 24. Each channel 104, 108 has a height H1 extending from an opening 112 defined in the planar top surface 84 toward a base 116, a width W1 defined in the direction from the forward side 96 to the rearward side 92, and a length L2 defined between the lateral sides 100a, 100b that is equal to the length L1 (FIG. 7). The first and second channels 104, 108 are substantially perpendicular to and extend through the lateral sides 100a, 100b. As seen in FIG. 8, the first channel 104 and the second channel 108 are substantially parallel to one another and spaced apart relative to one another to define a protrusion 120 therebetween. The protrusion 120 has a width W2 that is also measured from the forward side 96 to the rearward side 92. Each of the dimensions described above is sized such that the material receiving platform 24 may receive and support a standard steel stud (FIG. 16). For example, the first and second channels 104, 108 receive portions of the standard steel stud such that the steel stud is supported by protrusion 120. Generally speaking, standard steel studs have a width ranging from about 1.5 inches to 6 inches. Exemplary standard stud widths include approximately 1.75 inches, approximately 2 inches, approximately 2.5 inches, approximately 3 inches, approximately 3.625 inches, and approximately 3.75 inches. In addition, the steel studs have a gauge or thickness. The gauge of steel stud generally ranges from 10-25 gauge steel. In one example, the steel stud is 24 gauge steel.

In one embodiment, a width W3 that is measured from the forward side 96 to the first channel 104 corresponds to a standard steel stud width that is wider than the width W2 such that two different standard steel studs may be securely supported by the material receiving platform 24.

In another embodiment, the material receiving platform 24 includes the first channel 104 and a plurality of supplementary second channels. The supplementary second channels are generally parallel to and spaced apart from the first channel 104. Specifically, the supplementary second channels are spaced at varying distances from the first channel 104 to define multiple widths (W2) therebetween. The widths correspond to different standard stud widths such that a single material receiving platform 24 may support multiple standard studs for cutting operations. The first channel 104 receives a portion of the stud, and one of the supplemental second channels receives another portion.

In another embodiment, the width W1 of the first channel 104 and the second channel 108 may be widened such that two or more studs having a standard size or a standard gauge may be received in the channels 104, 108. For example, a first small stud may have a width corresponding to a width defined between a front end of the first channel 104 and a rear end of the second channel 108, while a second small stud may have a width corresponding to a width defined between a rear end of the first channel 104 and a front end of the second channel 108. This configuration allows each stud to be securely supported on the material receiving platform 24. In another example, the width W1 may vary according to the gauge of the steel so the width W1 corresponds to the gauge to securely support a specific gauge of steel.

In another embodiment, a platform extension member not shown) may be coupled to the forward side 96 of the material receiving platform. The platform extension member includes a top surface that is coplanar with the top surface 84 and a channel. The channel of the platform extension member is spaced a distance from the first channel 104 corresponding to a second standard width of a second stud.

In another embodiment, different tool heads 68 may be coupled to the tool head portion 40. The alternate tool heads 68 may have varying material receiving platforms 24 that, for example, have varied widths (e.g., W1, W2, and/or W3) to receive and support various standard steel stud widths and gauges. That is, each alternate tool head 68 may be configured to support one or more different standard steel studs.

With particular reference to FIG. 7, the material receiving platform 24 includes a blade channel 124 that extends through the entire material receiving platform 24 from the top surface 84 to the bottom surface 88 to define a top opening 128 (FIG. 4) and a bottom opening 132 (FIG. 5), The blade channel 124 extends perpendicularly between the first channel 104 and the second channel 108, and is continuous with each of the first channel 104 and the second channel 108. In other words, the blade channel 124 intersects the first and second channels 104, 108 and extends transversely to both of the first and second channels 104, 108. At the top opening 128, the blade channel 124 includes a first shear 136 with a shearing edge on the first lateral side of the blade channel 124 and a second shear 140 with a second shearing edge on the second lateral side of the blade channel 124. In one embodiment, the first shear 136 and the second shear 140 are made from the same material as the blade 28 (e.g., hardened steel). In other embodiments, the first shear 136 and the second shear 140 are made from a different material than the blade 28 (e.g., steel, carbide, etc.). In the illustrated embodiment, the first shear 136 and the second shear 140 are plates that are removably coupled to the lateral sides of the blade channel 124 such that the first shear 136 and the second shear 140 may be replaced (e.g., due to wear of the shears 136, 140). In other embodiments, the shears 136, 140 may be formed integrally with the material receiving platform 24 on either lateral side of the top opening 128.

With reference to FIGS. 7 and 8, the blade channel 124 has a height H2 extending from the top opening 128 defined on the top surface 84 to the bottom opening 132 defined on the bottom surface 88, a length L3 defined in the direction from the first lateral side 100a to the second lateral side 100b between the first shear 136 and the second shear 140 (FIG. 7), and a width W4 defined between the forward side 96 and the rearward side 92 (FIG. 8). As illustrated, the blade channel 124 extends entirely across the protrusion 120 and also at least a portion of the material receiving platform 24 between the forward side 96 and the second channel 108 (e.g., width W4). The blade channel 124 is sized and shaped to receive the pivoting blade 28 during cutting operations with a tolerance defined within the length L3 between the blade 28 and the first shear 136/second shear 140. In one embodiment, the tolerance is approximately 10% of the thickness of the material to be sheared (e.g., the steel stud). In other embodiments, the tolerance is approximately 5-15% of the thickness of the material to be sheared. More specifically, the tolerance may be approximately 8-12% of the thickness of the material to be sheared. However, other tolerance sizes may be used (e.g., based on material to be cut, etc.) The blade channel 124 dimensions are also sufficient to accommodate blades having different sizes and shapes. In addition, the bottom opening 132 permits metal slugs created during cutting operation to be dropped out of the blade channel 124.

With reference to FIG. 8, when the blade 28 is in the open position, the piercing portion 76 and the cutting portion 72 extend over the material receiving platform 24 toward the forward end 96. As illustrated, the blade 28 extends over the first channel 104. However, in other embodiments, the blade 28 may be positioned or rotated (e.g., to 90 degrees or greater relative to the top surface 84) such that when the blade 28 is the open position, the piercing portion 76 and the cutting portion 72 do not extend over the first channel 104. This may allow the user to, for example, place a steel stud into the channels 104, 108 on the material receiving platform 24 along a vertical insertion axis (i.e., dropped straight down into the channels 104, 108 rather than being inserted at an angle).

Figure 9:
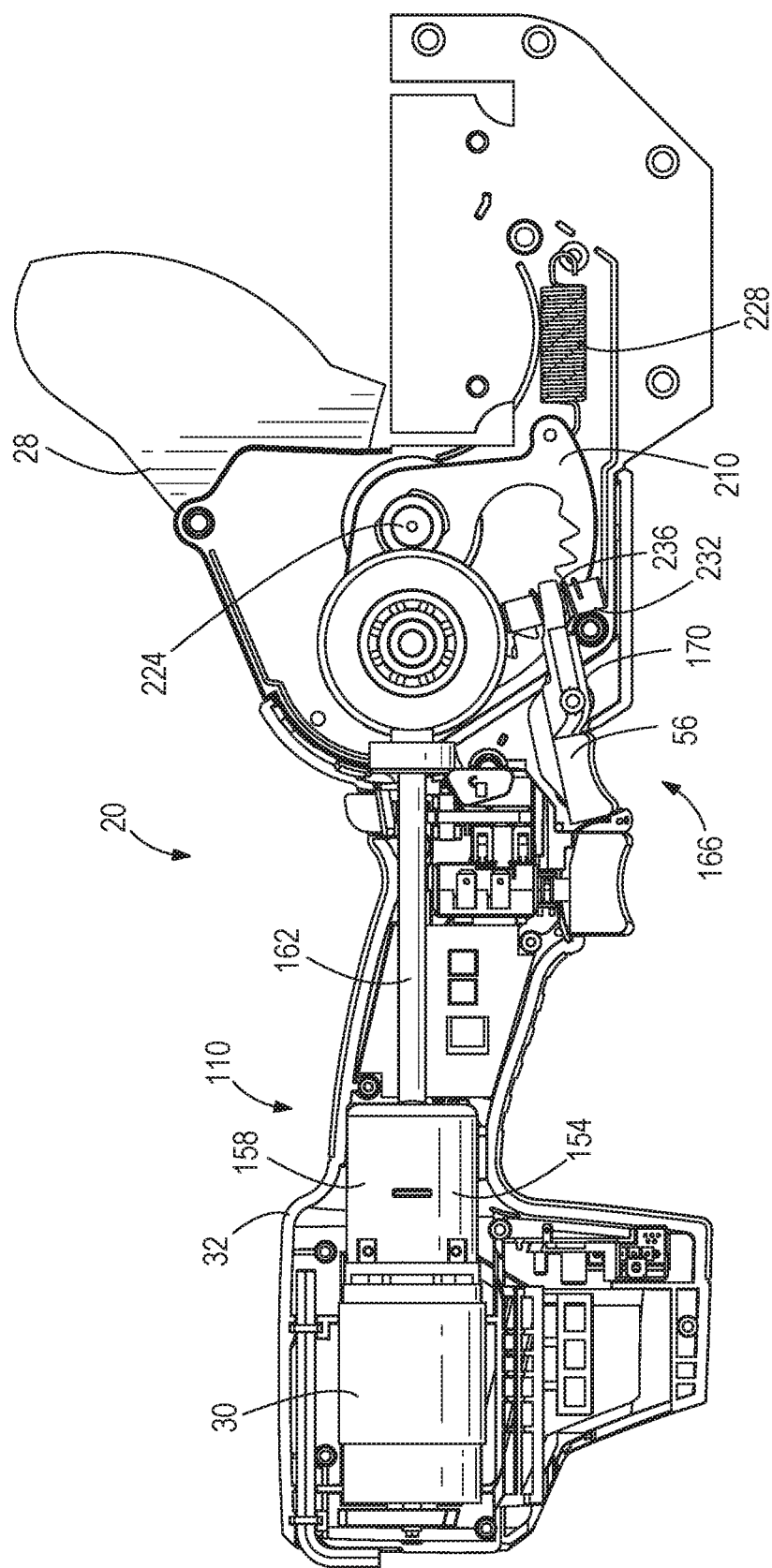
FIG. 9 is a side view of the material platform and the blade of the power shear tool of FIG. 1.
Figure 10:
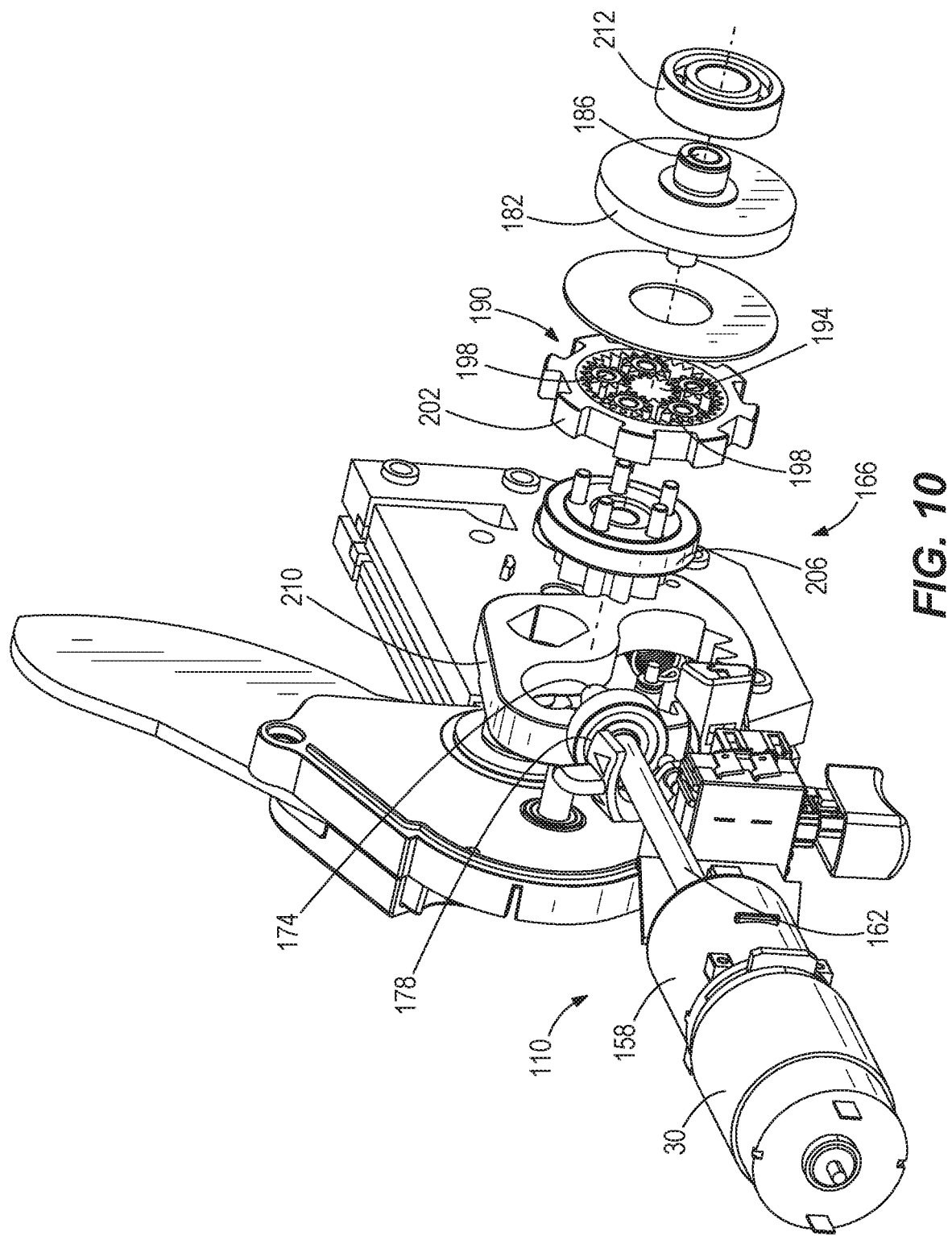
FIG. 10 is an exploded view of a blade transmission of the power shear tool of FIG. 1.
Figure 11:
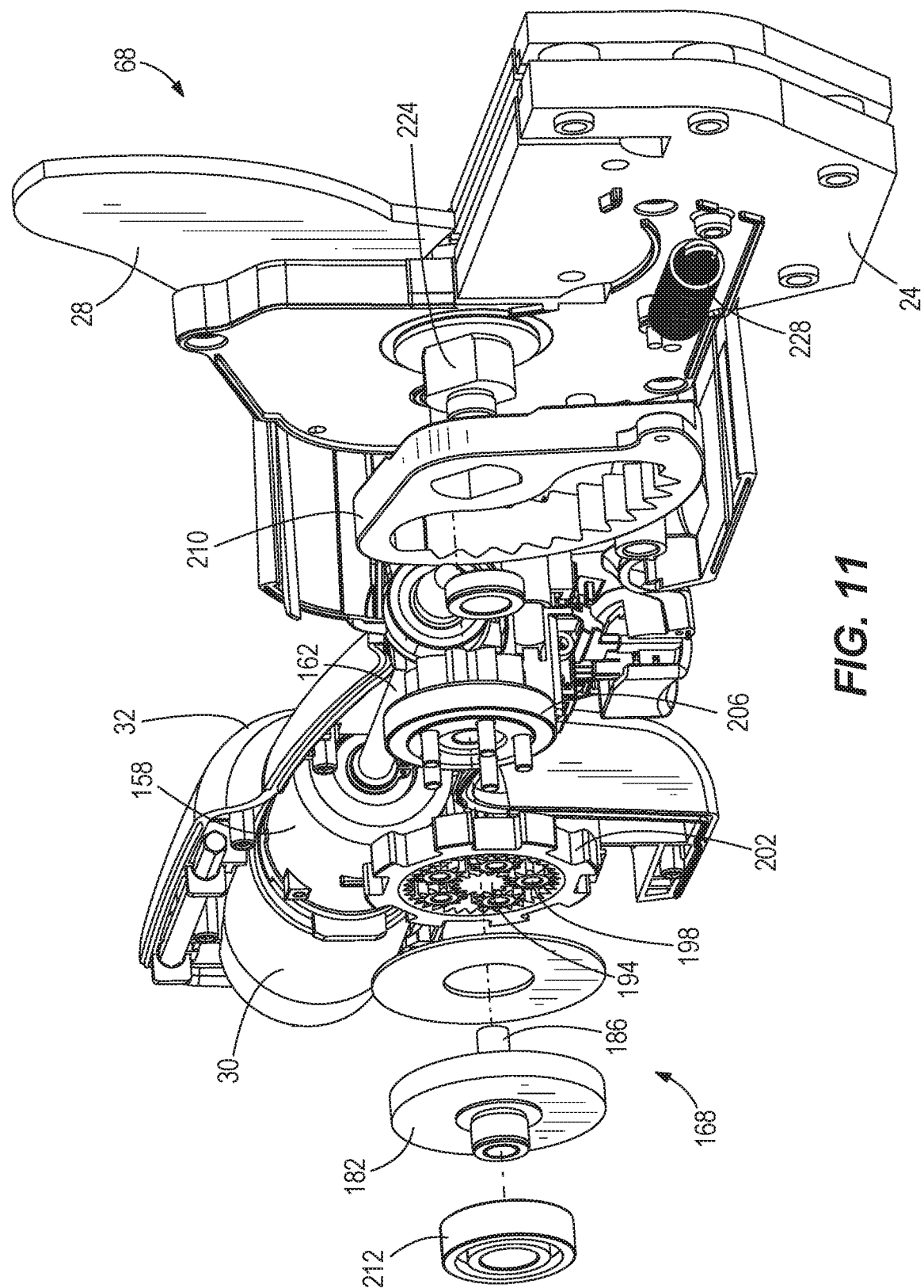
FIG. 11 is a second exploded view of the blade transmission of the power shear tool of FIG. 1.

With reference to FIGS. 9-11, the power shear tool 20 includes the motor 30 operatively coupled to the blade 28 via a drive mechanism 110. The drive mechanism 110 is supported within the main housing 32 and includes a motor transmission 154 (e.g., a gear reduction) encased by a motor transmission housing 158, and a drive shaft 162 coupling the motor transmission 154 to a blade driving transmission 166. In addition, the power shear tool 20 includes a blade return mechanism 170. The motor transmission 154 may be chosen based on a desired speed for cutting operations (i.e., the speed at which the blade 28 is driven) and a desired torque for the blade 28. Accordingly, multiple different transmissions 154 that meet desired parameters may be used. In some embodiments, the motor transmission 154 may be configured such that the power shear tool 20 can be operated in one or mode modes (e.g., high speed, medium speed, low speed, etc.).

As shown in FIG. 10, the drive shaft 162 includes a first end coupled to the motor transmission 154 and a second end including a first bevel gear 174 coupled to the blade driving transmission 166. The drive shaft 162 is rotatably supported by a bearing 178 disposed near the second end. The blade driving transmission 166 includes a second bevel gear 182 engagable with the first bevel gear 174 and fixedly coupled to an elongated shaft 186, a planetary gear reduction 190 having a sun gear 194, five planetary gears 198, and a ring gear 202 including inner teeth and outer teeth, a driven gear 206, and a blade pivoting gear 210. The second bevel gear 182 is rotatably supported by a bearing 212 and is fixedly coupled to a first end of the elongated shaft 186. A second end of the elongated shaft 186 is coupled to the sun gear 194 such that the elongated shaft 186 and sun gear 194 are co-rotational. The sun gear 194 is engaged by each of the five planetary gears 198, which also engage the inner teeth of the ring gear 202. The five planetary gears 198 each include a shaft coupled to the driven gear 206 on a first side of the driven gear 206. The second side of the driven gear 206 includes teeth that are engaged with inner teeth of the blade pivoting gear 210. As seen in FIG. 11, the inner teeth of the blade pivoting gear 210 extend about a portion of an inner wall of an aperture of the blade pivoting gear 210. The portion of the inner wall having teeth defines an arc length that corresponds to a stroke length of the blade 28. The blade pivoting gear 210 is coupled to the blade 28 via a blade shaft 224.

With reference to FIG. 9, the blade pivoting gear 210 is coupled to a biasing member 228 that biases the blade 28 toward an open position via the blade pivoting gear 210. As such, when the drive mechanism 110 is in a neutral condition, the biasing member 228 acts on the blade pivoting gear 210 to return the blade 28 to the open position.

With continued reference to FIG. 9, the drive mechanism 110 further includes a locking member 232 that is coupled to the second actuator 56. The locking member 232 is biased by a spring 236 into engagement with the outer teeth of the ring gear 202 to prevent rotation of the ring gear 202, thereby allowing the planetary gears 198 to move about the ring gear 202 to transmit rotation to the blade 28. When the user actuates the second actuator 56, the locking member 232 is disengaged form the outer teeth of the ring gear 202 such that the ring gear 202 is permitted to rotate (e.g., to place the drive mechanism into the neutral condition). This allows the biasing member 228 to act on the blade pivoting gear 210 to operate the blade return mechanism 170.

Figure 12:
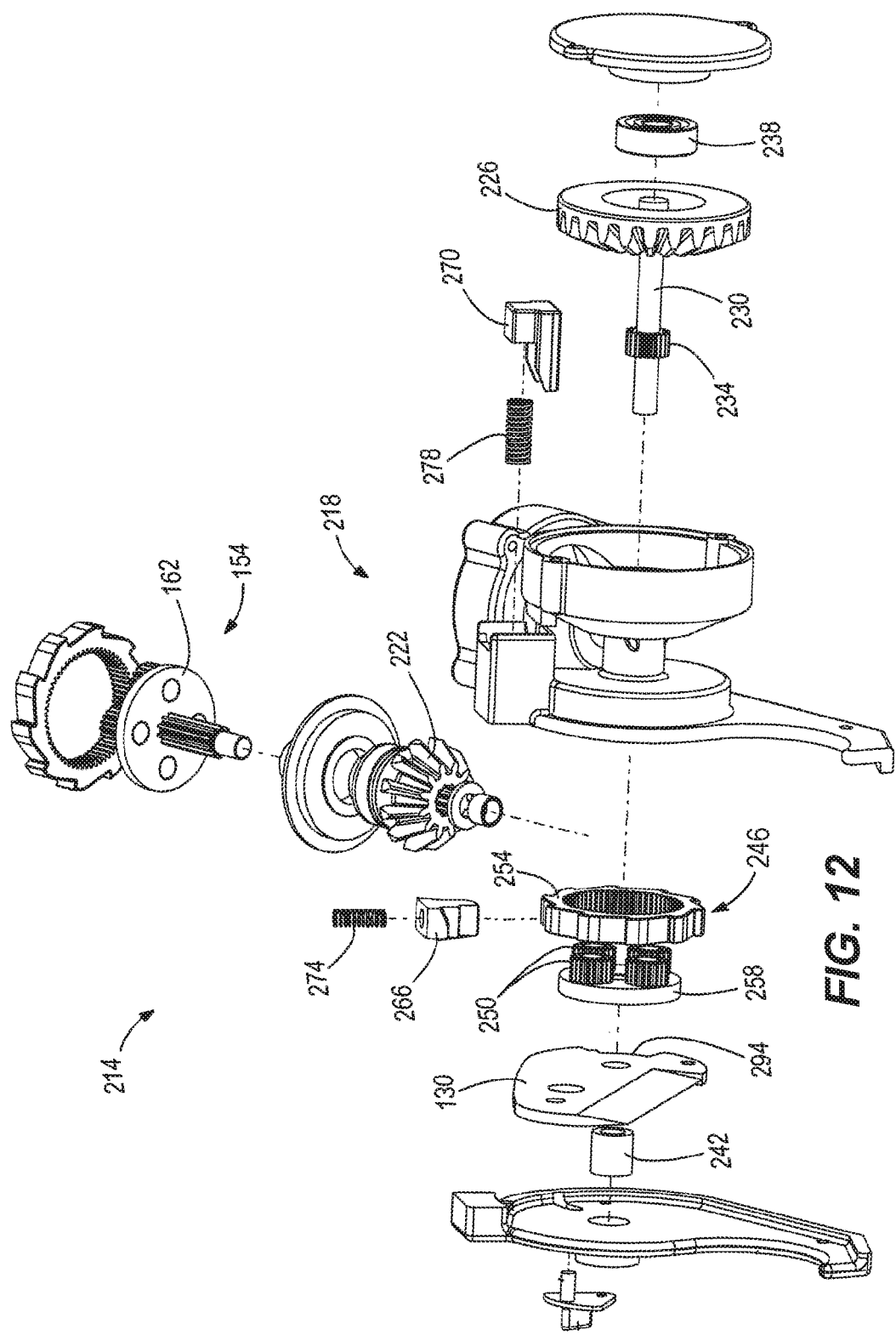
FIG. 12 is an exploded view of a second embodiment of a blade transmission of the power shear tool of FIG. 1.

FIG. 12 illustrates another embodiment of a drive mechanism 214, which includes another embodiment of the blade driving transmission 166 discussed above. The drive mechanism 214 includes the motor transmission 154 of FIGS. 9-11, and a blade driving transmission 218 to pivot the blade 28 relative to the material receiving platform 24. The illustrated blade driving transmission 218 includes a first gear 222 driven by the motor transmission 154 and a second gear 226, whereby the first gear 222 engages and drives the second gear 226. In the illustrated embodiment, the first gear 222 and the second gear 226 are bevel gears, although in further embodiments, the first and second gears 222, 226 may be other types of gears.

As shown in FIG. 12, the second gear 226 includes an elongated shaft 230 having a spline 234. The elongated shaft 230 extends axially outward from the second gear 226 through the blade 28. Bearings 238, 242 are positioned about opposite ends of the shaft 230 to support and guide the shaft 230 during rotation.

The gear assembly 218 also includes a planetary gear reduction 246. The planetary gear reduction 246 is positioned about the elongated shaft 230 and includes four planetary gears 250, a ring gear 254, and a driven gear 258. The spline 234 engages the planetary gears 250 such that, as the second gear 226 is rotated, the planetary gears 250 move about the shaft 230 within the ring gear 254. The driven, or output, gear 258 is coupled to the planetary gears 250 via short rods (not shown) such that the driven gear 258 rotates as the planetary gears 250 move within the ring gear 254. The driven gear 258 also engages the blade 28 to output rotation of second gear 226 to the blade 28 at a reduced speed. In some embodiments, the motor transmission 154 may be omitted or modified since the planetary gear reduction 246 in the blade driving transmission 218 reduces the speed of rotation from the motor 30.

In the illustrated embodiment, the blade driving transmission 218 includes a lock key 266 and a key release button 270. As shown in FIG. 12, the lock key 266 is biased by a spring 274 to engage the ring gear 254 to prevent rotation of the ring gear 254 relative to the material receiving platform 24. In this position, the planetary gear reduction 246 transmits rotation of the second gear 226 to the blade 28. The key release button 270, or actuator, is positioned adjacent to the lock key 266 and extends partially out of the material receiving platform 24. A spring 278 biases the button 270 slightly apart from the lock key 266 such that the button 270 does not disengage the lock key 266 from the ring gear 254.

Referring to FIG. 12, when the key release button 270 is depressed by the user against the bias of the spring 278, the button 270 lifts the lock key 266 out of engagement with the ring gear 254. In this position, the ring gear 254 can rotate relative to the material receiving platform 24 such that rotation of the second gear 226 is not transmitted to the blade 28, and rotation of the blade 28 is not transmitted to the second gear 226. The user can thereby manually pivot the blade 28 away from the material receiving platform 24 to the starting position without having to reverse the motor 30. In some embodiments, a biasing member, such as the biasing member shown in FIG. 9, may bias the blade 28 to the starting position.

Figure 13:
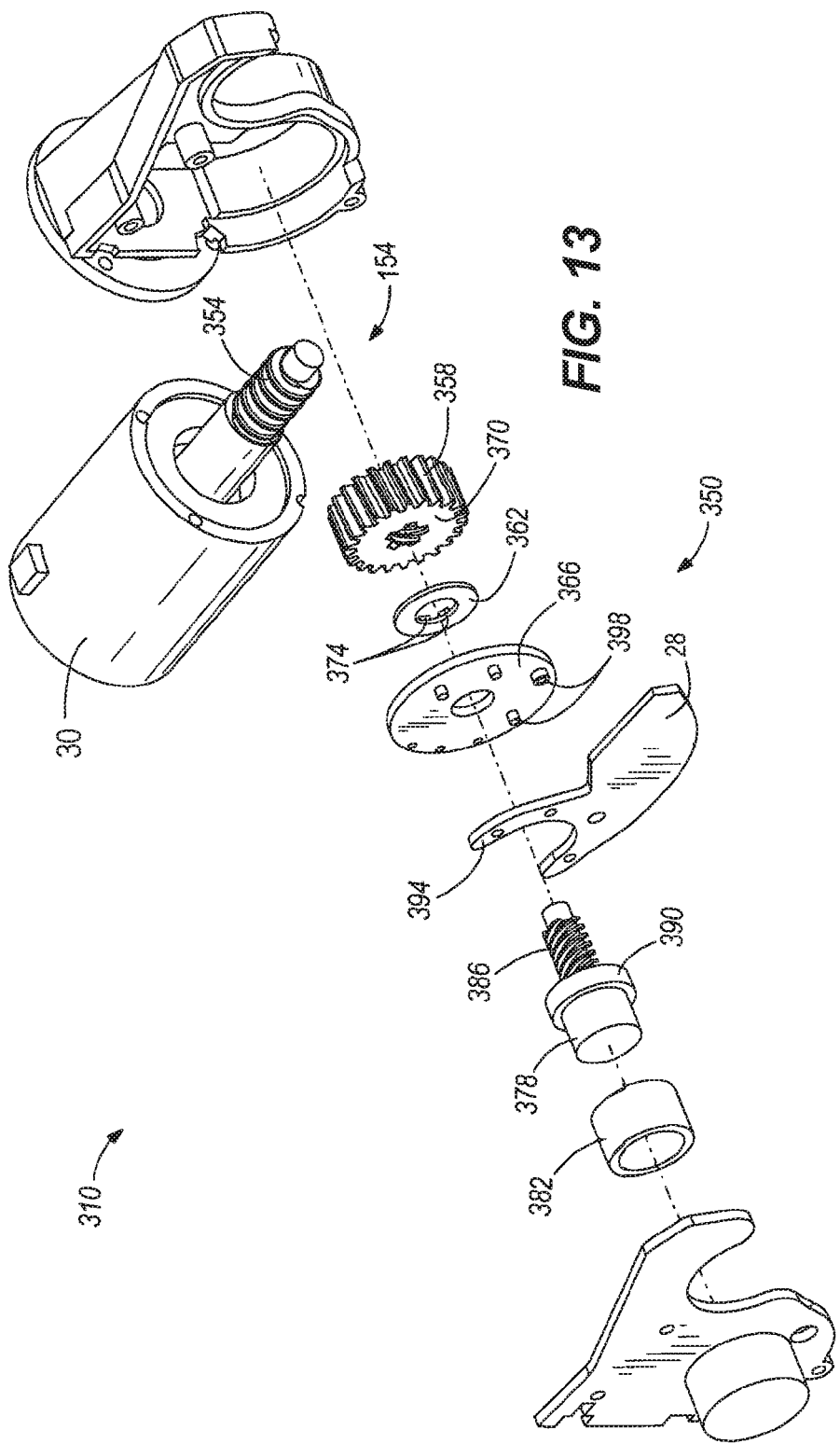
FIG. 13 is an exploded view of a third embodiment of a blade transmission of the power shear tool of FIG. 1.

FIG. 13 illustrates another embodiment of a drive mechanism 310 including the motor transmission 154 of FIGS. 9-11, but including another blade driving transmission 350 to pivot the blade 28 relative to the material receiving platform 24. In the illustrated embodiment, the drive mechanism 310 includes a spindle 354 extending from the motor 30, and the blade driving transmission 350 includes a gear 358 coupled to the spindle 354, a disc 362 supported by the gear 358, and a blade support 366 coupled to the blade 28. The spindle 354 is driven by the motor 30 and engages the gear 358 to transmit rotation of the motor 30 to the gear 358. The disc 362 is mounted to a face 370 of the gear 358 and includes tabs 374 extending into the gear 358 such that the disc 362 rotates with the gear 358. In some embodiments, the blade driving transmission 350 may include a gear reduction mechanism positioned between the spindle 354 and the gear 358.

The blade driving transmission 350 also includes a shaft 378 positioned within the material receiving platform 24 and extending through the gear 358, the disc 362, and the blade support 366. A bearing 382 is positioned about an end of the shaft 378 to support the shaft 378 during rotation. The illustrated shaft 378 includes a threaded portion 386 and a flange portion 390. The gear 358 includes internal threads to threadably couple to the threaded portion 386 of the shaft 378. As the gear 358 is rotated, the gear 358 moves axially along the threaded portion 386 toward and away from the flange portion 390, depending on the direction of operation of the motor 30. For example, operating the motor 30 in a forward direction moves the gear 358 toward the flange portion 390, while operating the motor 30 in a reverse direction moves the gear 358 away from the flange portion 390.

The blade support 366 is positioned about the threaded portion 386 of the shaft 378 between the disc 362 and the flange portion 390 of the shaft 378. In the illustrated embodiment, the blade support 366 rotates with the shaft 378 when the disc 362 frictionally engages the blade support 366 and is rotatable relative to the shaft 378 when the disc 362 disengages the blade support 366, as further described below.

The illustrated blade 28 includes a generally U-shaped portion 394 that partially surrounds the flange portion 390 of the shaft 378 adjacent to the blade support 366. In the illustrated embodiment, the blade support 366 includes a plurality of projections 398 extending axially through the U-shaped portion 394 of the blade 28 to couple the blade support 366 to the blade 28. The blade 28 is thereby pivoted relative to the material receiving platform 24 when the blade support 366 rotates. In other embodiments, other suitable coupling means may be employed to couple the blade support 366 to the blade 28.

When the motor 30 is operated in the forward direction, the gear 358 is rotated by the spindle 354 to thread further onto the threaded portion 386 of the shaft 378 and, thereby, move axially toward the flange portion 390. The gear 358 moves axially along the threaded portion 386 until the disc 362 tightly engages the blade support 366. Once the disc 362 tightly (e.g., frictionally) engages the blade support 366, the gear 358 no longer moves axially along the threaded portion 386, but begins rotating the shaft 378 relative to the material receiving platform 24. In addition, the blade support 366 is captured between the flange portion 390 and the disc 362 such that the blade support 366 rotates relative to the material receiving platform 24 with the gear 358 and the shaft 378. As the blade support 366 rotates, the blade 28 is pivoted from an open position toward the material receiving platform 24 to cut a stud supported by the material receiving platform 24.

When the motor 30 is operated in the reverse direction, the gear 358 is rotated by the spindle 354 to unthread from the threaded portion 386 of the shaft 378 and, thereby, move axially away from the flange portion 390. As the gear 358 moves away from the flange portion 390, the disc 362 also moves axially away from the blade support 366 such that the disc 362 no longer tightly engages the blade support 366. Once the disc 362 has sufficiently disengaged the blade support 366, the blade support 366 can rotate relative to the gear 358 and the shaft 378, allowing the blade 28 to return to the starting position without further operation of the motor 30 in the reverse direction. In some embodiments, the blade 28 can be pivoted away from the material receiving platform 24 manually. In other embodiments, the blade 28 can be pivoted away from the material receiving platform 24 automatically with a biasing member, such as the biasing member shown in FIG. 9.

Figure 14:
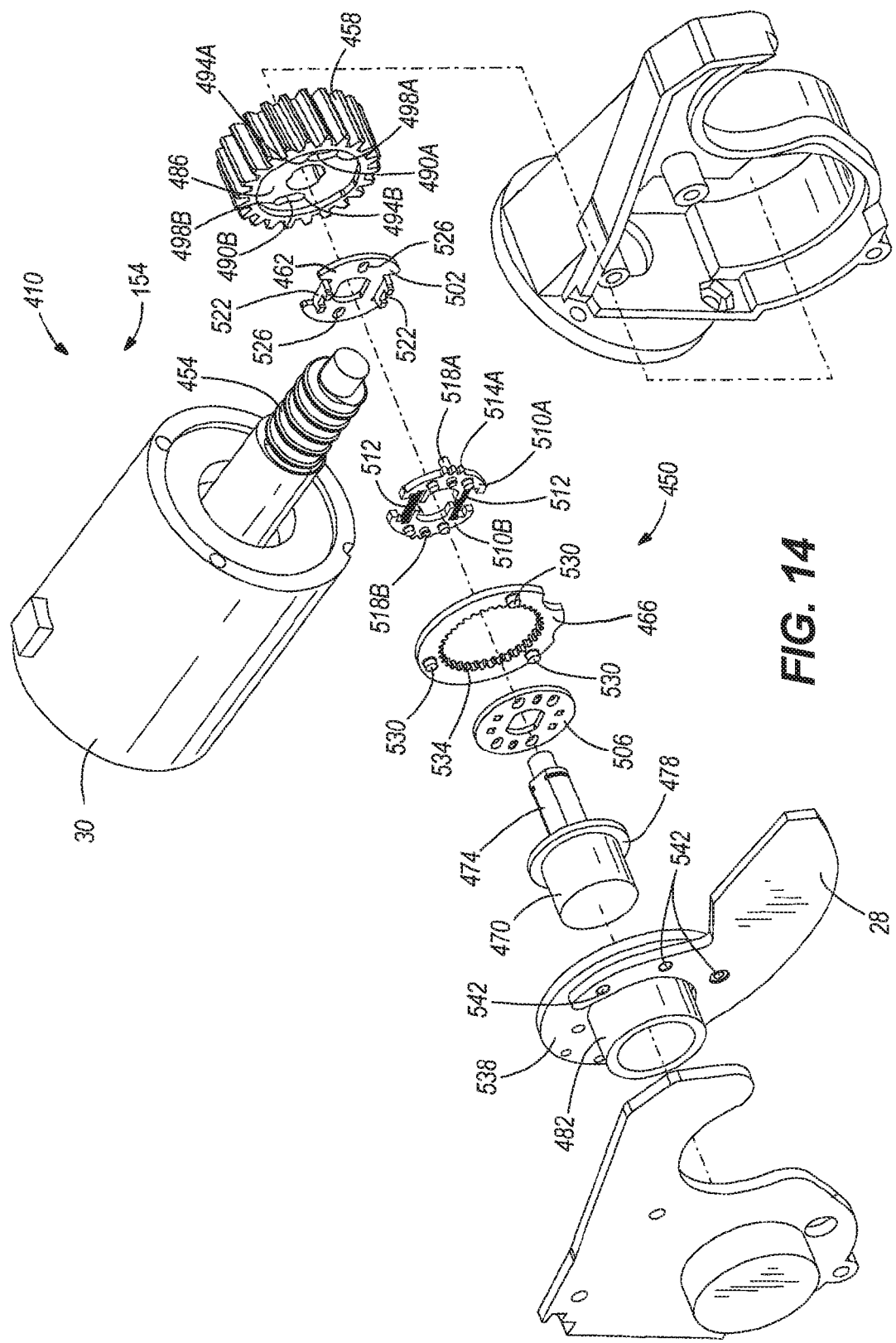
FIG. 14 is an exploded view of a fourth embodiment of a blade transmission of the power shear tool of FIG. 1.

FIG. 14 illustrates yet another embodiment of a drive mechanism 410, which includes the motor transmission 154 of FIGS. 9-11 and blade driving transmission 450 to pivot the blade 28 relative to the material receiving platform 24. In the illustrated embodiment, the blade driving transmission 450 includes a spindle 454 extending from the motor 30, a first gear 458 engaging the spindle 454, a second gear 462 coupled to the first gear 458, and a third gear 466 positioned about the second gear 462. The blade driving transmission 450 also includes a shaft 470 having a generally non-cylindrical portion 474 and a flange 478. The non-cylindrical portion 474 extends through the gears 458, 462, 466 such the shaft 470 rotates with the first gear 458 and the second gear 462 relative to the material receiving platform 24. A bearing 482 is positioned about an end of the shaft 470 to support the shaft 470 during rotation.

The first gear 458 intermeshes with the spindle 454 to rotate with the spindle 454 when the motor 30 is operated. As shown in FIG. 14, the first gear 458 includes a recessed surface 486 and defines two slots 490A, 490B in the recessed surface 486. In some embodiments, the first gear 458 may define fewer or more slots. Each slot 490A, 490B has a generally dog-legged shape and includes a radial inner portion 494A, 494B and a radial outer portion 498A, 498B. The outer portions 498A, 498B are angled, or sloped, relative to the inner portions 494A, 494B to define the dog-legged shape of the slots 490A, 490B.

The illustrated second gear 462 includes a first outer casing 502, a second outer casing 506, and two gear portions 510A, 510B positioned between the casings 502, 506. The gear portions 510A, 510B are coupled together with two biasing members 512 (e.g., coil springs) that bias the gear portions 510A, 510B apart from one another. Each gear portion 510A, 510B includes three teeth 514A, 514B formed on an outer perimeter of the gear portion 510A, 510B and a pin 518A, 518B extending axially toward the first gear 458. In other embodiments, each gear portion 510A, 510B may include fewer or more teeth formed on the outer perimeter of the gear portion 510A, 510B. The pins 518A, 518B extend into the corresponding slots 490A, 490B in the first gear 458 and are movable within the slots 490A, 490B between the inner portions 494A, 494B and the outer portions 498A, 498B. When the pins 518A, 518B are positioned within the outer portions 498A, 498B of the slots 490A, 490B, the gear portions 510A, 510B are biased apart from one another to a spread position. When the pins 518A, 5189 are positioned within the inner portions 494A, 4949 of the slots 490A, 490B, the gear portions 510A, 510B are moved toward one another to a collapsed position. The first outer casing 502 includes tabs 522 and clearance grooves 526 to help limit the range of movement of the gear portions 510A, 510E between the spread and collapsed positions.

The third gear 466 is a ring gear that surrounds the gear portions 510A, 510B of the second gear 462. The illustrated third gear 466 includes three pins 530 extending axially away from the first gear 458 and a series of teeth 534 extending radially inward to engage the teeth 514A, 5149 on the gear portions 510A, 510B. When the gear portions 510A, 510B are in the spread position, the teeth 514A, 5149 on the gear portions 510A, 510B engage the teeth 534 of the third gear 466 to transmit rotation from the second gear 462 to the third gear 466. When the gear portions 510A, 510B are in the collapsed position, the teeth 514A, 5149 on the gear portions 510A, 510B are spaced apart from the teeth 534 of the third gear 466, allowing relative rotation between the second gear 462 and the third gear 466.

The blade driving transmission 450 also includes a blade support 538 positioned about the flange 478 of the shaft 470 and coupled to the third gear 466. In the illustrated embodiment, the blade support 538 is coupled to the third gear 466 by the pins 530 extending axially from the third gear 466 such that rotation of the third gear 466 is transmitted to the blade support 538. The illustrated blade support 538 includes pins 542 extending axially away from the third gear 466 to also couple the blade support 538 to the blade 28. In other embodiments, the blade support 538 may be coupled to the third gear 466 and/or the blade 28 using other suitable coupling means.

The motor is operable in a forward direction and a reverse direction. When the motor 30 is operated in the forward direction, the first gear 458 is rotated by the spindle 454 such that the pins 518A, 518B of the gear portions 510A, 510B move to the outer portions 498A, 498B of the slots 490A, 490B in the first gear 458. The gear portions 510A, 510B are thereby moved to the spread position, as shown in FIG. 14. In this position, the teeth 514A, 514B on the gear portions 510A, 510B engage the teeth 534 of the third gear 466 to transmit rotation from the first gear 458 to the third gear 466. The third gear 466 in turn rotates the blade support 538 to pivot the blade 28 from an open position toward the material receiving platform 24 to cut a stud supported by the material receiving platform 24.

When the motor 30 is operated in the reverse direction, the first gear 458 is rotated by the spindle 454 such that the pins 518A, 518B of the gear portions 510A, 510B move to the inner portions 494A, 494B of the slots 490A, 490B in the first gear 458. The gear portions 510A, 510B are thereby moved to the collapsed position. In this position, the teeth 514A, 514B on the gear portions 510A, 510B are spaced apart from the teeth 534 of the third gear 466, allowing the third gear 466 to rotate relative to the second gear 462. When the third gear 466 is disengaged from the second gear 462, the blade 28 can pivot back to the starting position without further operation of the motor 30 in the reverse direction. In some embodiments, the blade 28 can be pivoted away from the material receiving platform 24 manually. In other embodiments, the blade 28 can be pivoted away from the material receiving platform 24 automatically with a biasing member, such as the biasing member show in FIG. 9.

Figure 15:
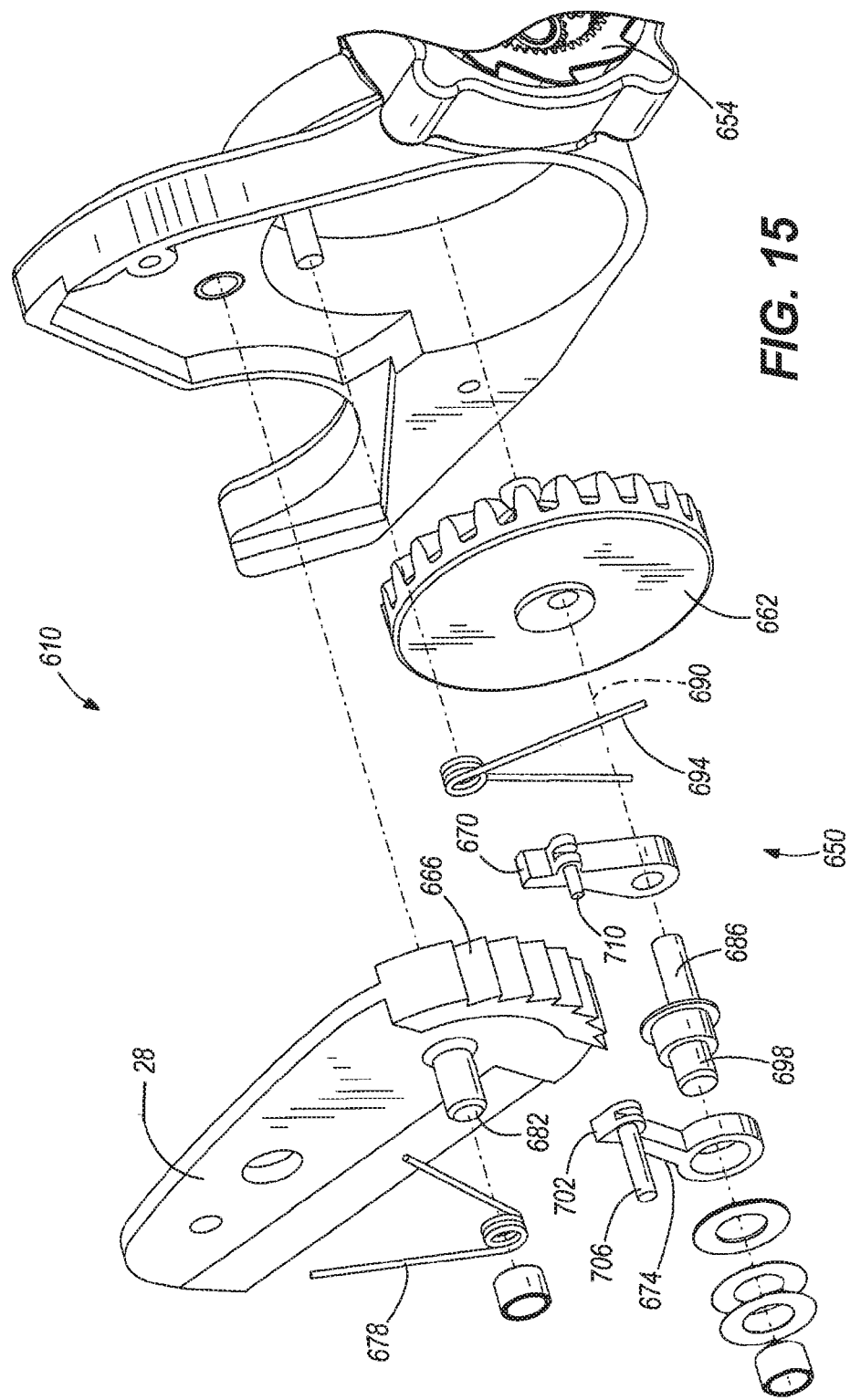
FIG. 15 is an exploded view of a fifth embodiment of a blade transmission of the power shear tool of FIG. 1.

FIG. 15 illustrates yet another embodiment of a drive mechanism 610, which includes the motor transmission 154 of FIGS. 9-11 and a blade driving transmission 650 to pivot the blade 28 relative to the material receiving platform 24. The blade driving transmission 650 includes a planetary gear reduction 654 coupled to and driven by the motor, a first gear (not shown) coupled to and driven by the planetary gear reduction 654, and a second gear 662 intermeshed with the first gear. In the illustrated embodiment, the first gear and the second gear 662 are bevel gears, although in further embodiments, the first gear and the second gear 662 may be other types of gears.

As shown in FIG. 15, the blade driving transmission 650 also includes a gear rack 666, a drive pawl 670, and a retaining pawl 674. In the illustrated embodiment, the gear rack 666, or toothed portion, is formed along an edge of the blade 28 within the material receiving platform 24. In other embodiments, the gear rack 666 may be a separate gear coupled to the blade 28. A biasing member 678, or return spring, is coupled to a shaft 682 extending from the blade 28. The return spring 678 engages the gear rack 666 and the material receiving platform 24 to bias the blade 28 away from the material receiving platform 24 to a starting position.

The illustrated drive pawl 670 is coupled to the second gear 662 by a crank shaft 686. The crank shaft 686 is offset from a central axis 690 of the second gear 662 such that, as the second gear 662 rotates about the central axis 690, the drive pawl 670 is moved relative to the second gear 662. The drive pawl 670 engages the gear rack 666 to move the blade 28 against the bias of the return spring 678 toward the material receiving platform 24 to cut a stud. A biasing member 694, or pawl spring, is positioned between the drive pawl 670 and the material receiving platform 24. The pawl spring 694 biases the drive pawl 670 into continuous engagement with the gear rack 666 as the second gear 662 rotates.

During rotation of the second gear 662, the drive pawl. 670 engages a tooth of the gear rack 666 and pushes the tooth away from the central axis 690, pivoting the blade 28 about the shaft 682. After a complete revolution of the second gear 662, the drive pawl 670 is moved into engagement with the next tooth of the gear rack 666 to push that tooth away from the central axis 690. As such, each rotation of the second gear 662 moves the drive pawl 670 into engagement with a successive tooth of the gear rack 666 to pivot the blade 28 toward the material receiving platform 24 in a ratchet-like manner.

The retaining pawl 674 is coupled to the material receiving platform 24 on a shaft 698 extending from the material receiving platform 24 toward the second gear 662. In the illustrated embodiment, the shaft 698 is substantially coaxial with the central axis 690 of the second gear 662. As shown in FIG. 15, the retaining pawl 674 includes a hooked portion 702 and a lever 706. The hooked portion 702 engages the gear rack 666 to inhibit the blade 28 from returning to the starting position when the drive pawl 670 slides from one tooth of the gear rack 666 to the next. The drive pawl 670 also includes a projection 710 that engages the retaining pawl 674 such that the retaining pawl 674 is biased by the pawl spring 694 into engagement with the gear rack 666.

The lever 706, or actuator, extends through a slot (not shown) in the material receiving platform 24. The lever 706 is actuable by the user to move the retaining pawl 674 out of engagement with the gear rack 666. When the retaining pawl 674 is pivoted away from the gear rack 666, the retaining pawl 674 engages the projection 710 of the drive pawl 670 to also move the drive pawl 670 out of engagement with the gear rack 666. The pawls 670, 674 are thereby disengaged from the gear rack 666 such that the return spring 678 biases the blade 28 away from the material receiving platform 24 and back to the starting position. Releasing the lever 702 returns the pawls 670, 670 into engagement with the gear rack 666, allowing the blade driving transmission 650 to pivot the blade 28 back toward the material receiving platform 24 to cut a stud.

In operation, the user places a steel stud 1000 (FIG. 16) on the material receiving platform 24 such that a pair of side rails 1004a, 1004b of the stud 1000 are received within one of the channels 104, 108 while a base 1008 of the stud 1000 is supported on the top surface 84. This may be accomplished by sliding the side rails 1004a, 1004b laterally into the first channel 104 and the second channel 108 along the direction from the first lateral side 100a to the second lateral side 100b (i.e., along a horizontal insertion axis), or by placing a side rail 1004a into the first channel 104 along the direction from the top surface 84 to the bottom surface 88 (e.g., along a vertical insertion axis) and pivoting the other side rail 1004b into the second channel 108. In the embodiment where the blade 28 is not disposed over the first channel 104 in the open position, the stud 1000 may be inserted along a vertical insertion axis such that both the side rails 1004a, 1004b are approximately simultaneously received into the first channel 104 and the second channel 108. When the stud 1000 is supported on the material receiving platform 24, the material support length L1 along the top surface 84 is long enough to, support the stud 1000 securely to prevent wobbling in any direction during cutting operation.

Once the stud 1000 is aligned on the material receiving platform 24, the user operates the first actuator 52 to drive the motor 30 when the third actuator 60 is in the unlocked position. The motor 30 drives the blade 28 via the drive mechanism 110 described above to complete the cutting stroke of the blade 28. During the cutting stroke, the piercing point 80 makes first contact with the stud 1000 to create an initial puncture for the blade 28. As the cutting stroke continues, the edges 74a, 74b of the blade 28 and the first and second shear 136, 140 cut through the base 1008 and the sidewalls 1004a, 1004b of the stud 1000 to complete the cutting operation of the stud 1000. Any metal slugs created by the cutting operation may drop out of the bottom opening 132.

When the cutting operation is complete and the separate stud portions are removed from the material receiving platform 24, the user actuates the blade return mechanism 170 by depressing the second actuator 56. As described above, actuation of the second actuator 56 disengages the ring gear 202 and the locking member 232 such that the ring gear 202 (and therefor the driven gear 206 and blade pivoting gear 210) is allowed to rotate freely. The biasing member 228 can then act on the blade pivoting gear 210 to drive the blade 28 to the open position. In other embodiments, the biasing member 228 may be omitted such that the user operates the blade 28 between the completed cut position and the open position while depressing the second actuator 56. Alternatively, the user may operate the fourth actuator 64 to reverse the direction of the motor 30, Then, the user may depress the first actuator 52 such that the motor 30 drives the blade 28 via the drive mechanism 110 from the completed cut position to the open position.

The power shear tool 20 described above is a compact, portable tool that allows a user to easily cut studs (e.g., formed from steel or other metallic material) that may be securely retained by the material receiving platform 24 for cutting operations. Due to the compact nature of the tool, a user may hold the tool with one hand and support an end of the stud with another during cutting operation, further adding to the ease of use.

Although the invention has been described in detail with reference to certain preferred embodiments, variations and modifications exist within the scope and spirit of one or more independent aspects of the invention as described.

What is claimed is:

1. A power shear tool comprising:
a housing portion;
a motor positioned within the housing portion;
a tool head portion extending from the housing portion and including a blade rotatable relative to the tool head portion; and a workpiece support member positioned proximate the tool head portion, the workpiece support member including,
a top surface and a bottom surface opposite the top surface,
side surfaces extending between the top and the bottom surfaces,
a first end surface extending between the side surfaces, the first end surface positioned adjacent the tool head portion,
a second end surface extending between the side surfaces, the second end surface positioned opposite from the first end surface,
a first channel defined in the top surface and extending from at least one of the side surfaces, the first channel proximate the first end surface,
a second channel defined in the top surface, the second channel intersecting the first channel and extending transverse to the first channel, and
a third channel spaced apart from and generally parallel to the first channel, the third channel defined in the top surface of the workpiece support member, the third channel proximate the second end surface, the second channel intersecting the third channel and extending transverse to the third channel,
wherein each of the first channel and the third channel is configured to receive a portion of a workpiece at the same time,
wherein the second channel has a longitudinal width extending between an edge of the first channel and an edge of the third channel, and
wherein the blade is configured to be received within the entire longitudinal width of the second channel between the edge of the first channel and the edge of the third channel.

2. The power shear tool of claim 1, wherein the workpiece support member includes a protrusion defined between the first and third channels, and further wherein the second channel extends from the top surface through the protrusion.

3. The power shear tool of claim 2, wherein the first channel, the third channel, and the protrusion are sized such that the workpiece support member receives and supports the workpiece.

4. The power shear tool of claim 2, wherein the first and third channels are configured to receive the portions of the workpiece such that the workpiece is supported by the protrusion.

5. The power shear tool of claim 1, wherein the workpiece support member includes a pair of lateral sides defining the second channel, and further comprising a shearing edge positioned along each lateral side of the second channel.

6. The power shear tool of claim 1, wherein the motor is operatively coupled to the blade for rotating the blade.

7. The power shear tool of claim 1, wherein the blade includes a cutting portion and a piercing portion, and wherein the piercing portion defines a point that is a first point of contact between the blade and a workpiece.

8. The power shear tool of claim 7, wherein the piercing portion includes an edge that terminates in the point.

9. The power shear tool of claim 8, wherein the cutting portion of the blade includes a first end and a second end, wherein the cutting portion includes a flat arcuate section extending from the first end to the second end, and wherein the edge extends from the second end to the point.

10. The power shear tool of claim 1, wherein the blade is rotatable between an open position, in which the blade extends over the first channel, and a closed position, in which a portion of the blade is received in the second channel.

11. The power tool of claim 1, wherein the blade is pivotably coupled to the tool head portion and receivable within the second channel.

12. A power shear tool comprising:
a housing portion;
a motor positioned within the housing portion;
a handle including a grip positioned adjacent to the housing portion;
a tool head portion extending from the housing portion and including a blade rotatable relative to the tool head portion, the blade including a flat arcuate cutting edge portion having a first end and a second end, and a piercing portion having two substantially linear edges that meet at a piercing point, at least one of the substantially linear edges extending from the second end of the cutting edge portion; and
a workpiece support member positioned proximate the tool head portion, the workpiece support member including,
a top surface and a bottom surface opposite the top surface,
side surfaces extending between the top and the bottom surfaces,
a first channel defined in the top surface and extending from at least one of the side surfaces,
a second channel spaced apart from and generally parallel to the first channel, the second channel defined in the top surface;
a third channel defined in the top surface, the third channel intersecting the first channel and the second channel and extending transverse to the first channel and the second channel, and
a pair of lateral sides defining the third channel, wherein a shearing edge is positioned along each lateral side of the third channel,
and
wherein the third channel is configured to receive the piercing point of the piercing portion which is the first point of contact between the blade and a workpiece.

13. The power tool of claim 12, wherein the first channel is configured to receive a portion of a workpiece.

* * * * *